Oct. 15, 1957  S. H. SVENSSON  2,809,551
DEVICE FOR DETERMINING THE REFRACTIVE INDEX
IN STRATIFIED SOLUTIONS
Filed Feb. 18, 1954  3 Sheets-Sheet 3
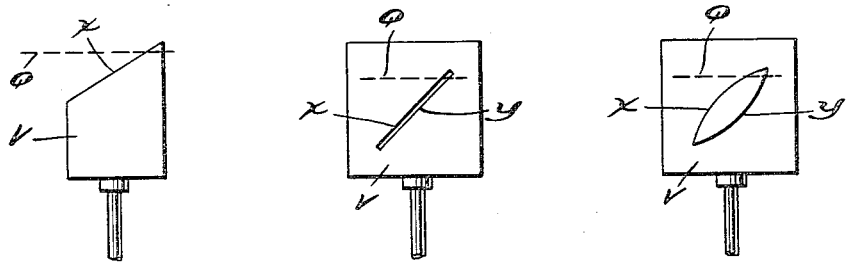
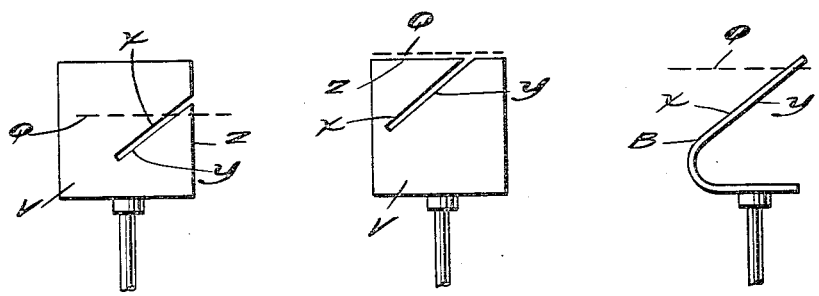
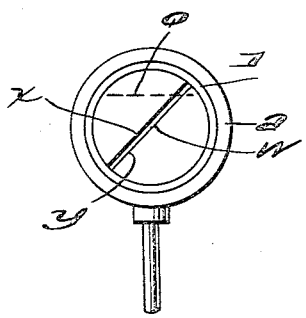
INVENTOR
Svante Harry Svensson
BY Pierce, Scheffler & Parker
ATTORNEYS

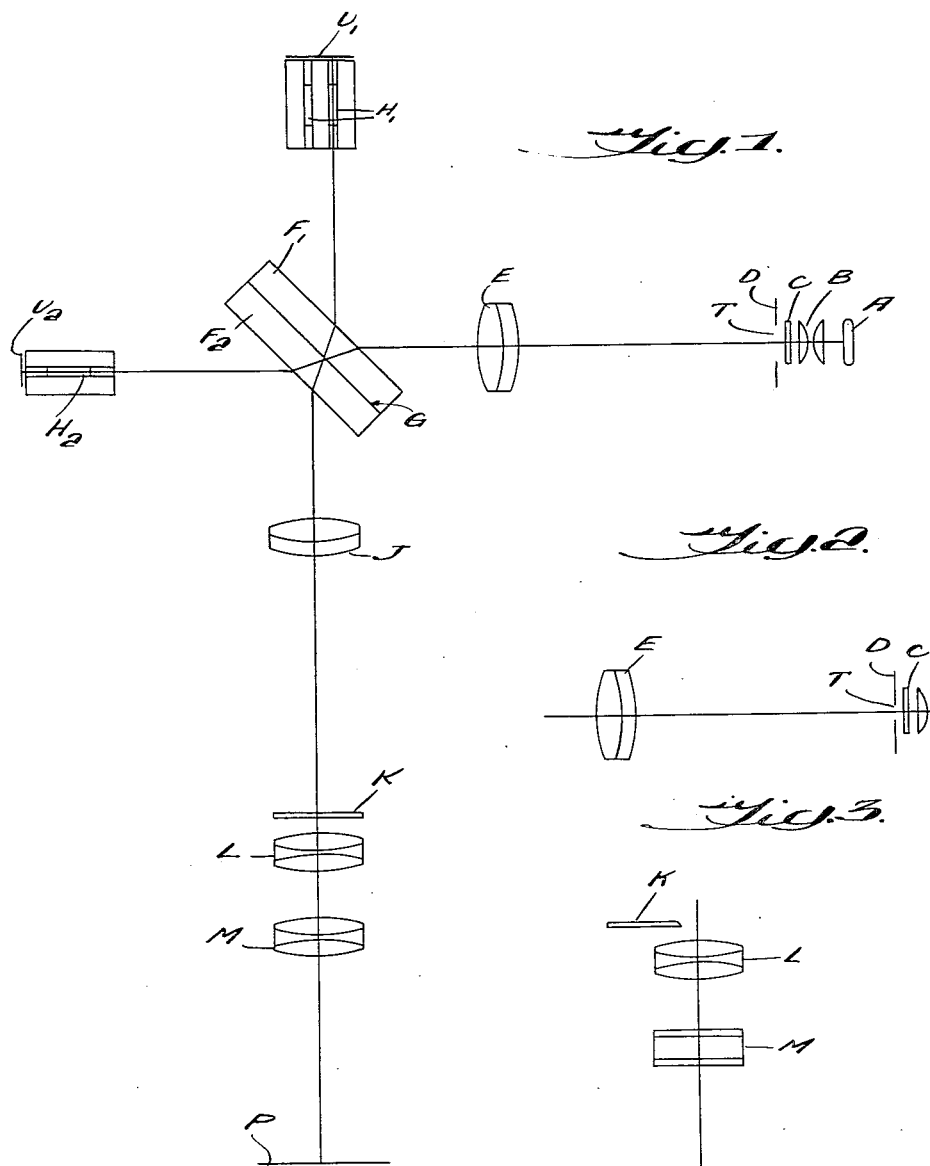

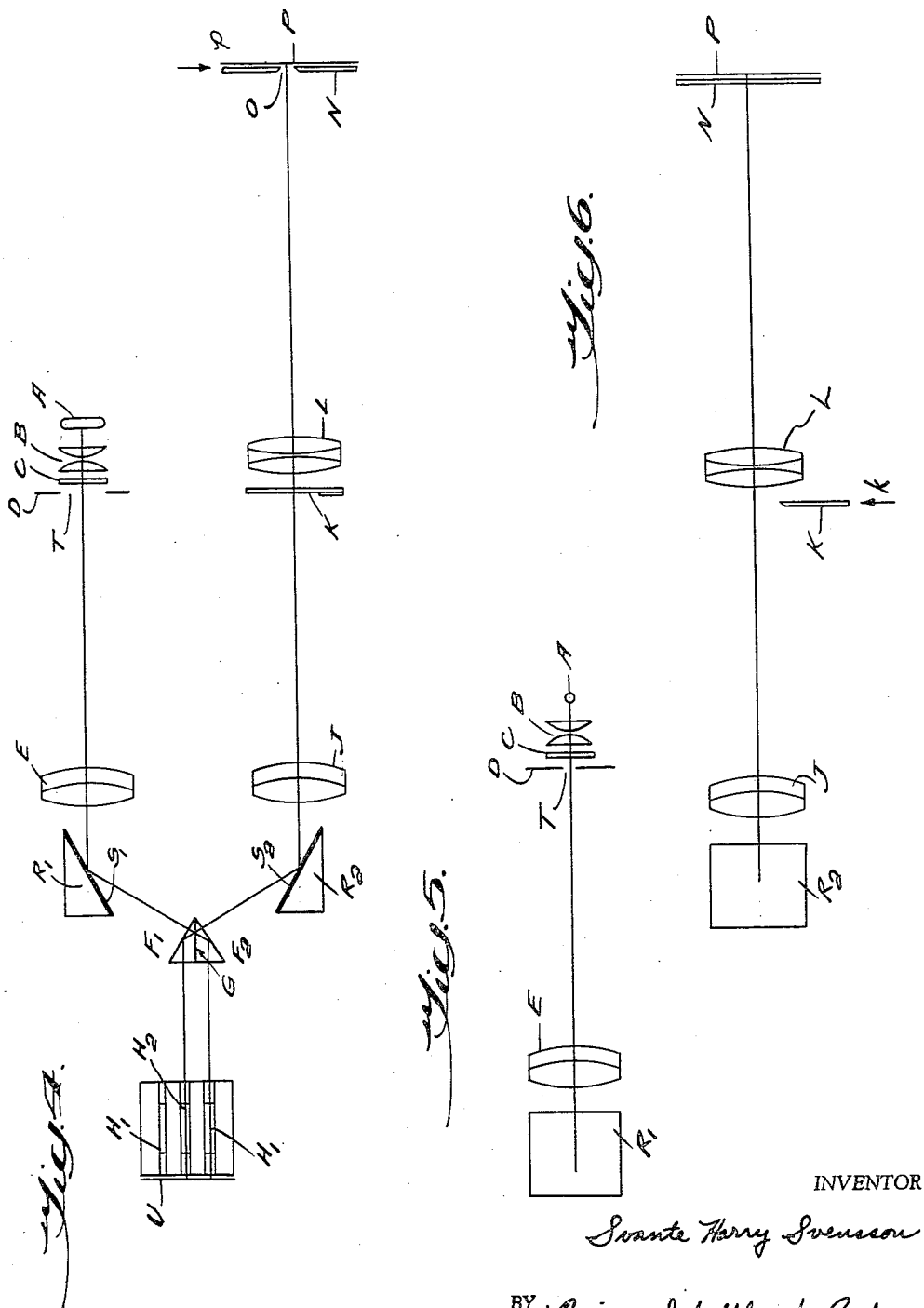

2,809,551

DEVICE FOR DETERMINING THE REFRACTIVE INDEX IN STRATIFIED SOLUTIONS

Svante Harry Svensson, Sundbyberg, Sweden, assignor to LKB-Produkter Fabriksaktiebolag, Stockholm, Sweden, a company of Sweden Application February 18, 1954, Serial No. 411,226

Claims priority, application Sweden May 11, 1953

18 Claims. (Cl. 88—14)

Refractive index measurements from point to point in cells with stratified solutions have since a long time been used in electrophoretic analysis, in diffusion measurements and in sedimentation measurements in centrifuges as a convenient and accurate means of obtaining a complete concentration analysis of solutes throughout the sample cell. After the inventor pointed out in some articles the demand and possibility of a simultaneous and direct recording of the refractivity function as well as of its first derivative (Acta Chemica Scandinavica 3, 1170, 1949; 4, 399 (1950); 5, 1301, 1951; Teknisk Tieskrift 82, 841, 1952), Swedish as well as foreign instrument manufacturers have started making electrophoresis instruments with arrangements for such combined optical concentration recording. Within a few years instruments with such possibilities will probably be regarded as a necessity and not as a luxury in the scientific laboratories.

The methods hitherto described for combined recording of the refractivity function and its derivative are based on Rayleigh's interference principle, according to which two coherent pencils of light are produced with the aid of a double slit (aperture-splitting). The present invention describes how the corresponding result can be obtained by the use of partial transmission and reflexion at a phase boundary for the production of two coherent beams of light (amplitude-splitting). The interferometers according to Michelson, Jamin and Zehnder-Mach are working after this principle, but they can't be used in their original forms for the purpose in question since they require a point-shaped light source, while the best and most commonly used derivative-recording method requires an extended light source.

According to the present invention, the refractivity function is thus recorded with the aid of an amplitude-splitting interferometer, while the recording of the derivative is accomplished by the aid of the methods heretofore known since a long time, i. e. with the air of an automatic modification of the Schlieren method. The Schlieren method is based on the fact that a light pencil that passes through an inhomogeneous medium, or through a body not plano-parallel, suffers an angular deection which in magnitude and direction is determined by the gradient of the optical thickness. In the prevailing case, stratified solutions in cells with plano-parallel walls, this light deflection consequently always goes in the vertical direction, since the optical thickness is constant in each horizontal plane, and the magnitude of the light deflection becomes proportional to the derivative of the optical thickness with regard to the vertical coordinate, or to the derivative of the refractivity if the cell walls are plano-parallel and mutually parallel.

The astigmatic modification of the Schlieren method which give diagrams of the refractive index derivative as a function of the vertical cell coordinate, are based on optical imagery of the cell in a vertical section through the optical system and on a transformation of the originally vertical light deflection in the cell to a horizontal displacement in the optic image plane of the cell. Two principally different methods for this purpose are described in the literature, namely the mechanical modification (Longsworth, J. Am. Chem. Soc. 61, 529, 1939) and the astigmatic modification (Philpot, Nature 141, 283, 1938; Svensson, Kolloid-Z. 87, 181, 1939; Kolloid-Z. 90, 141 (1940); Ark. Kem. Min, Geol. 22 A, Nr. 10, 1946). In the former the vertical light deflection is transformed to a horizontal displacement with the aid of an arrangement consisting of a narrow, vertical slit closely in front of the plate and of a mechanical device for simultaneous movement of the plate in a horizontal and of the Schlieren diaphragm in a vertical direction. The optical system forming an image of the cell may be spherical. In the latter the transformation is carried out with the aid of an arrangement comprising a diagonal slit, edge or wire instead of Schlieren diaphragm and an astigmatic lens system which in a vertical section gives optical imagery of the cell, in a horizontal section optical imagery of the diagonal slit, edge or wire on the photographic plate.

The astigmatic modification of the Schlieren method requires for its proper functioning a slit-shaped light source. The mechanical modification also functions with a point-shaped light source, but for reasons of light economy it is of course valuable if one can use a slit here too. As already mentioned, the generally used constructions of amplitude-splitting interferometers cannot be used in connection with extended light sources. In order to make the combined recording possible, one must consequently construct an interferometric arrangement in which the optical path difference between the courses of the two coherent beams from cell and reference cell respectively to the plate is independent of the entrance angle of the light against object and reference object. In order to understand what is required for this condition to be satisfied, it is necessary first to study Mach-Zehnder's interferometer, e. g., in order to see which of its properties make it impossible to use oblique light.

The use of collimated light from an extended light source, or the use of non-collimated light, involves that a divergent light beam originates from each point of object and reference object. In order to make interference possible, it is necessary that all pencils in these two beams are recollected to one and the same point in the optic image plane of the object. From this it follows that the optical image plane of the reference object must coincide with that of the object, i. e. the optical distance of the two objects to the image-forming lens system must be equal. This is generally not the case in Mach-Zehnder's interferometer. On the other hand, if one tries to realize this condition by displacement of the reference object along the optic axis, one will find that this is only possible for one wave-length at a time. While the light from one object passes the supporting glass mass of the last, half-transparent mirror only once, the light from the other object must pass the said thickness of glass twice. This difference in glass thickness must be compensated by a corresponding difference in air thickness, but the thickness of the equivalent layer of air is a function of the refractive index and thus of the wave-length.

This asymmetry between the two light paths could be compensated by introducing an inclined plate of the same thickness as the half-transparent mirror into one light beam, as is done in a Michelson interferometer in order to make interference in white light possible. The disadvantages caused by the inclined plates themselves will then, however, still remain.

As is well-known, a plano-parallel plate standing perpendicular to the light path causes a certain displacement of the optical image plane which is colour-dependent and thus should influence the chromatic correction of the lenses of the system. The optical action of the plate shows for the rest a rather small dependence of the entrance angle of the light pencils, which mathematically appears in the manner that only every second power is to be found in the corresponding series developments. An inclined glass plate is more dangerous from a dioptrical point-of-view. It optical phase shift, parallel displacement, and displacement of the optical image plane is strongly dependent on those differences in entrance angle which occur in a divergent or convergent light beam. Mathematically this appears in the way that, if the mentioned properties are expanded into series as functions of the angle of a pencil with the central one in the beam, all terms are present in the series. Already the second degree terms will consequently cause optical aberrations which cannot, like third degree terms, be corrected for by a special design of the lenses.

According to the present invention, the use of an extended light source in an interferometer is thus made possible partly; by securing a complete symmetry with regard to the beam-splitting foil between the paths of the two coherent light beams and between optical components therein, partly by excluding inclined plano-parallel plates from the optical system. The beam-splitting device thus consists of a half-transparent metal foil enclosed between and in optical contact with two congruent, plane surfaces of two optical elements of homogeneous and transparent material and with well-defined outer boundary surfaces which are mutual mirror images with reference to the foil and which are oriented perpendicularly to the central ray in the respective beams. The device for reuniting the coherent beams shall have the same construction. The courses of the light beams betweeen beam-splitting and beam-reuniting devices shall also be mutual mirror images, as well as optical components situated there. Reflexions in front-surface mirrors and these mirrors themselves are, however, excepted from this requirement, as well as the difference between object and reference object. Such reflexions can be permitted in order to save space or for other reasons without violating the principles of the invention. The cell and the reference cell must, however, be of the same dimensions so far as concerns the different optical materials in the path of the rays, and the distance of the cells from the beam-splitting and -reuniting devices has to be the same in the two light paths. With these conditions satisfied, one can obtain well-defined interference fringes in the coinciding optical images of the cell and reference cell even if the light source has a considerable extension. The possibility of a simultaneous derivative recording according to the variants of the Schlieren method is thus given.

In the accompanying drawings,

Fig. 1 is a schematic horizontal section through one embodiment of the invention;

Figs. 2 and 3 are schematic vertical sections through different portions thereof:

Fig. 4 is a schematic horizontal section through another embodiment of the invention;

Figs. 5 and 6 are schematic vertical sections through different portions thereof; and Figs. 7 to 13 are elevations of various forms of partially light-obstructing devices.

Figs. 1, 2 and 3 illustrate an apparatus which is adapted for the astigmatic modification of the Schlieren method. A denotes a lamp giving a line spectrum, B a condensing lens system, C a light filter which sorts out one spectral line of the lamp, and D a diaphragm having a narrow slit T in the focal plane of a collimating lens E. The slit T is shown as horizontal, but this is not essential. The slit must not, however, be vertical. G is a half-transparent metal foil, enclosed between glass plates $F_1$ and $F_2$. $H_1$ is a sample cell, here assumed to be an electrophoresis cell having two limbs, while $H_2$ is a reference cell. $U_1$ and $U_2$ are mirrors in the form of silver foils which are provided at the rear walls of the sample and the reference cells. J is an astronomical objective which collects the parallel light to form an image of the slit T in the plane of a partially light-obstructing device K. The device K may be a diaphragm which has light-absorbing and light-transmitting portions separated by at least one sharp edge which cuts the image of the slit T near one end. L is a spherical lens and M is a cylindrical lens having a vertical axis. P is a light-sensitive member, e. g. a photographic plate.

In the horizontal section, the planes D, K and P are conjugate image planes, whereas in the vertical section the mirrors $U_1$ and $U_2$ on one hand and the plane P on the other hand are optically conjugate.

Figs. 4, 5 and 6 illustrate an apparatus which is adapted for the mechanical modification of the Schlieren method. A denotes a lamp giving a line spectrum, B a condensing lens system, C a light filter which sorts out one spectral line of the lamp, and D a diaphragm having a narrow slit T in the focal plane of a collimating lens E. The slit T must not be vertical. $R_1$ and $R_2$ are glass prisms which are coated with reflecting layers $S_1$, and $S_2$. G is a half-transparent metal foil, enclosed between glass prisms $F_1$ and $F_2$. $H_1$ is a sample cell, here assumed to be an electrophoresis cell having two limbs. $H_2$ is a reference cell, arranged between the limbs of the sample cell. U is a mirror in the form of a silver foil which is arranged at the rear wall of the cell unit. J is an astronomical objective; which collects the parallel light to form an image of the slit T in the focal plane of said objective where there is arranged a partially light-obstructing device K comprising a diaphragm which has light-absorbing and light-transmitting portions separated by at least one rectilinear edge extending parallel with the image of the slit T. The device K is arranged to be movable in a vertical direction, as indicated by the arrow $k$. L denotes a spherical lens, N a diaphragm having a narrow vertical slit O, and P denotes a light-indicating member e. g. a photographic plate, which is movable in a horizontal direction, as indicated by arrow $p$.

When the mechanical modification of the Schlieren method is used, the cylindrical lens M of the astigmatic modification, as shown in Figs. 1 to 3, is not employed, the plane P is then optically conjugate with the back, reflecting wall U of the cells in both sections, see Figs. 4 to 6.

In order to facilitate the understanding of the functioning of this optical system, it follows here, with reference to the figures, first an explanation how the interferogram appears, then an analysis of how the derivative pattern is formed, and finally a discussion of the way in which the optical components serving only one method influence the function of the other, and how they can be brought to function simultaneously.

For the formation of the interferogram, the components K, M and N are unnecessary or obstructive, for which reason, to begin with, we imagine them as absent. The monochromatic light from the light source arrangement ABC is made parallel by the collimating lens E and then strikes the foil G under an acute angle. Here a splitting occurs into two coherent beams of light, one reflected and one transmitted. In Fig. 1, these beams are conducted directly one to each cell, while in Fig. 4 they are first made parallel by total reflexion against each one of the hypotenuse surfaces of the component prism F. The back, reflecting walls of the cells turn the rays back again the same way, hence, the beam-splitting device $F_1F_2G$ also serves as a beam-reuniting device. Part of the radiant energy from each cell takes the course into the objective J and reaches the light-indicating device P by way of the cell-focusing objective L.

The cell and the reference cell, as well as the paths of the rays to them and back from them, are complete mirror images of each other with regard to the half-transparent foil G. Therefore a complete equality in the optical path lengths, i. e. in the sums of the products of geometric distances and refractivities, prevails between the two light paths, except the differences in refractivity which are to be measured. There is also complete identity in the geometric-optical distances, i. e. the sums of the ratios between geometric distances and refractivities, between the two light paths. It is this circumstance that makes it possible to use and extended light source, and on account of the same condition the back reflecting walls of both cells can simultaneously be optically conjugate to the plane of the light-indicating device. The two cell images coincide in this plane, and since all conditions for interference are satisfied, this image will be filled with a system of interference fringes which constitute a record of the difference in optical thickness between the two cells.

As long as one restricts oneself to interferometric recording, the opening T in the diaphragm D need not be slit-shaped. Said opening may be allowed to have a great extension in both dimensions, thus to be rectangular, square, circular etc.

If the gradient of the difference in optical thickness between sample cell and reference cell is everywhere vertically directed, which is the case for stratified solutions in cells with optically homogeneous, parallel, and mutually parallel walls, all interference fringes in the interferogram will lie horizontally. If the cell walls do not satisfy the above-mentioned requirement, the interference fringes can be inclined and even curved, but the interferometric method will, nevertheless, function. With the arrangement according to Figures 1–3, an oblique fringe system can be made horizontal by a turning adjustment of the reference cell $H_2$ round a vertical axis.

With the arrangement according to Figs. 4–6, such an adjustment is not possible, but, on the other hand, it is probable that possible prismatic distortions in the cell walls in this construction are more or less completely compensated by the fact that sample cell $H_1$ and reference cell $H_2$ possess equally great distortions. It is also an advantage that the fringe system is rather insensitive to small displacements and rotations of the cell. The arrangement according to Figs. 1–3 requires very rigid cell holders with adjustment arrangements for one cell, and a shake-proof room. The latter arrangement puts considerably less demands in this respect.

If we next consider the derivative recording by the astigmatic modification of the Schlieren method, then the diaphragm D has to have a slit-shaped opening T, further there must be at K a partially light-obstructing device with at least one sharp boundary line between light-absorbing and -transmitting material, this line crossing the optical image of the slit T. If one disregards the interferometric device $F_1F_2G$, the optical arrangement becomes identical with that described in the literature. The mentioned interferometric device does not in any way disturb the recording of the derivative.

This derivative-recording method requires for its proper functioning that the gradient of the optical thickness in the cells is directed vertically. If there is a horizontal component, the method cannot record it, but it gives rise to blurring in the diagram. With cells that are not distortion-free it may thus be necessary to introduce a vertical stop in front of them, which stop is made so narrow that the optical thickness of the cells does not vary to any considerable extent across its breadth.

It is said in all literature of this observation method that the slit T has to be perpendicular to the refractive index gradient, thus horizontal in the present case, but this is not necessary. The slit in question may have any orientation except vertical or near vertical.

The partially light-obstructing device K can generally be described as a diaphragm having a light-obstructing and a light-transmitting portion separated by at least one sharp boundary line or edge, which edge is not vertical and cuts the image of the slit T near one end. The angle at this point of intersection defines the sensitivity of the derivative recording. The partially light-obstructing device can thus be rotatable round the said point of intersection, whereby a continuously variable sensitivity is obtained. One can also have different exchangeable diaphragms, characterized by different fixed sensitivities, or a linearly displaceable element, containing light-obstructing edges of different angles after each-other in the displacement direction. Finally, a varying sensitivity can also be obtained by one single partially light-obstructing component K, while the above-mentioned constructions are instead applied to the light source slit. Some embodiments of partial light-obstructing elements will be described later with reference to Figs. 7 to 13.

The way of functioning of this method is as follows. The parallel light entering the cells suffers in each point of them a change in direction which as to magnitude and direction is determined by the gradient of the optical thickness. If we assume distortion-free, plano-parallel cells, the light deflection will consequently be vertical, and its magnitude proportional to the refractivity derivation with respect to the vertical coordinate. Only the light from the gradient-free portions of the cells will thus be collected to the normal image of the light source slit in the plane K. Deflected light lies above or below this slit image, hence in the general case one has illumination over a whole rhomboidal field in the plane K. The partially light-obstructing device is so oriented that its sharp edge forms a diagonal in this illuminated field. The illuminated field can be regarded as a collection of displaced slit images, and the points of intersection between these and the edge of the light-obstructing device will consequently become not only vertically but also horizontally displaced in comparison with the point of intersection with the normal slit image. The horizontal component of this displacement is, with a certain magnification or reduction, transformed to the light-indicating member P since the planes K and P are optically conjugate image planes in a horizontal section.

Simultaneously, however, the cells and the plane P are optically conjugate in the vertical section. On account of this the horizontal displacement at the light-indicating member P becomes, for each vertical cell coordinate, proportional to the refractivity gradient prevailing at this coordinate.

In the simplest case the partially light-obstructing device has one single rectilinear edge between light-absorbing and light-transmitting portions. Such a partially light-obstructing device V is illustrated in Fig. 7, in which the obstructing edge is denoted X. Said edge makes an acute angle with the optical image indicated at Q. On the light-indicating member one then obtains one full shadow, one half shadow and one bright field. The boundary line between the first two fields will then give the contour of the derivative of the optical thickness of one cell with regard to the height coordinate, the contour between the two latter fields the corresponding function for the other cell. If, now, both cells are distortion-free, and if the reference cell is filled with a homogeneous medium, the first mentioned contour becomes a straight vertical line, the base line, while the other contour constitutes the gradient curve of the sample.

If the partially light-obstructing device has two mutually parallel, adjacent, rectilinear edges between light-absorbing and light-transmitting portions, one can denote it as a slit, if the light-transmitting portion lies between the edges; see Fig. 8 in which the edges X and Y form a slit which makes an acute angle with the optical image Q. On the light-indicating member one then obtains two bright contours on a dark background, one representing the derivative of the optical thickness of the sample cell, the other that of the reference cell. On the other hand, if the optically opaque material lies between the two edges, the partially light-obstrucing device can be designed in the form of a bar or stretched wire or band. Two embodiments of such a partially light-obstructing device are illustrated in Figs. 12 and 13. The device according to Fig. 12 comprises a bar B, having two straight edges X and Y. The device shown in Fig. 13 comprises a wire W having two straight edges X and Y. The wire is secured at both ends in a ring 1, which is rotatably carried by a ring-shaped holder 2. By rotating the ring 1, the angle between the wire W and the light source slit image Q may be varied. On the light-indicating member one then obtains two contours in the form of half shadows, one showing the course of the derivative of the optical thickness in the sample cell, the other showing the corresponding function in the reference cell.

In the litertature of the astigmatic derivative-recording method one finds advice to use lenticular slits. The shape of this slit should then be such that the midpoints of the segments which the slit cuts out of straight lines parallel with the light source slit image all lie on one and the same straight line. Otherwise the curves obtained will suffer from systematic errors. Derivative curves obtained with the aid of lenticular slits are characterized by being of a more even thickness along their whole course than curves obtained with parallel slits. The same effect is of course obtained by the use of partially light-obstructing devices in which the material within the outline of the lenticular area is opaque, the material outside it transparent. When lenticular, partially light-obstructing devices are used, one tip of the slit should coincide or nearly coincide with the non-deflected optical image of the light source slit.

A wedge-formed, partially light-obstructing device, with its tip lying in the same way as mentioned above for the lenticular slit, can also be used.

In the recording of the derivative according to the mechanical modification of the Schlieren method, no cylindrical lens is used. A narrow slit O must be present closely in front of the light-in-dicating device P. On account of the fact that this slit cuts out a narrow vertical strip from the centre of the cell images, this derivative-recording method will function even with cells with optical distortion, and without insertion of stops in front of the cell. The partially light-obstructing device K still lies in the conjugate image plane of the light source slit. Universally it can be described as a diaphragm having light-absorbing and light-transmitting portions separated by at least one sharp, rectilinear edge, which edge is always parallel with the optical image of the light source slit. Finally, the mechanical modification is characterized by an arrangement for simultaneous, slow displacement of the partially light-obstructing device in a vertical direction and of the light-indicating member in a horizontal direction.

It is then easy that the partially light-obstructing device together with the fixed slit O and the above mentioned displacement arrangement constitutes a mechanical device for transformation of the originally vertical light deflection in the cell into a proportional horizontal displacement on the light-indicating member.

In its simplest form, the partially light-obstructing device comprises a diaphragm with one single, rectilinear edge between light-absorbing and light-transmitting portions. The image obtained is completely identical with that obtained by the astigmatic method by the use of the corresponding type of partially light-obstructing device.

If the partially light-obstructing device is designed with two mutually parallel edges between light absorbing and light-transmitting portions, it can be denoted as a slit if the light-transmitting portion is between these edges. The image obtained is in no way different from that acquired in the astigmatic method by the use of the corresponding type of partially light-obstructing device. If the light-absorbing material lies between the two edges, the partially light-obstructing device can be designed in the form of a strip, a bar, a streched wire, or a stretched band. Even in this case one obtains images identical with those in the astigmatic method for the correpsonding construction of the light-obstructing device.

After this description of the individual observation methods and their different variants, it is easy to understand how a combined arrangement for simultaneous recording of both interferogram and derivative curve operates. We will then first assume that the astigmatic derivative-recording arrangement is being used.

The optical components that serve the derivative recording but not the interference method are the partially light-obstructing device and the cylindrical lens. Both these components can be suspected of disturbing the interference method under certain circumstances. Thus oblique interference fringes on the whole cannot appear in the presence of the cylindrical lens. If there are oblique fringes in the cell image without the cylindrical lens, one consequently will get a general blurring of all fringes after the insertion of the cylindrical lens. On the contrary, if the fringes are horizontally oriented without the cylindrical lens, they will still remain in the presence of the cylindrical lens and extend over the whole image field. If it is impossible to realize horizontal fringes, due to distortion in the cell walls, one has to introduce narrow vertical stops at the cells, as before mentioned.

The partially light-obstructing device can of course also be suspected of disturbing the functioning of the interference method in the way that the conditions for interference cannot be satisfied, if one of the coherent pencils is obstructed. Exactly this fact is, however, used in this invention in order to acquire a combined recording of both the refractivity function and its derivative.

One must expect those portions of the image field which are illuminated by both the coherent beams of light to contain interference fringes, but not other portions. These portions, being filled with and free from fringes, respectively, border, however, on each other along a curve which is identical with the derivative of the optical thickness in one of the cells, according to what has been shown before. The conclusion is thus justified that, when combined recording is used, the derivative contour will be defined as the border line between portions of the image field being filled with and free from fringes, respectively.

It was mentioned above in the description of the astigmatic derivative-recording method that three fields, viz. one dark, one half-illuminated and one fully illuminated, are obtained on the light-indicating member, if one uses a partially light-obstructing device with one single edge between light-absorbing and light-transmitting portions according, for example, to Fig. 7. It follows that, when the combined recording method is used, only the latter field can be filled with interference fringes. The two contours between the three fields visualize the courses of the derivatives of the optical thicknesses of the two cells with respect to the height coordinate. The contour which originates from the reference cell is generally straight and can suitably be denoted as a reference line, while the contour originating in the sample cell is the desired gradient curve of the sample. Which of the two outer fields that will be filled with interference fringes depends on the order in which the transparent and the opaque material come in the partially light-obstructing device when passing downwards. In one case one gets the interference fringes below the base-line, in the other above the gradient curve.

If a bar, a stretched wire or a stretched band is used as a partially light-obstructing device, according to Figs. 12 and 13, or the corresponding lenticular slit constructions, the whole image field will be illuminated by both the coherent beams except the very gradient curve and the reference line. Interference fringes will consequently appear everywhere except there, and these contours will become visible as portions free from fringes in a background filled with fringes.

When a slit of linear form or the corresponding lenticular construction is used as a partially light-obstructing device, as shown for example in Figs. 8 and 9 respectively, no portions of the image field become illuminated except the gradient curve itself and the reference line. The conditions for interference will thus only prevail where these two lines overlap or coincide. One can, however, procure interference fringes throughout the whole cell if certain conditions are fulfilled and by using a special construction of the partially light-obstructing device. If, namely, the second derivative of the optical thickness of the reference cell is zero, all light from this cell will be collected into one single, sharpe image of the light source slit, while the light from the sample cell will be spread over a rhomboidal area in the plane of the partially light-obstructing device, due to a non-vanishing second derivative. If all light deflection takes place in the same direction, and if the cell and reference cell have the same prismatic error, the light from the reference cell will be collected into one of the four edge lines of this rhomboidal area. If, now, this light is allowed to pass without interruption, it will uniformly illuminate the whole image field. If the light is also allowed to pass through a slit along the diagonal in the said rhomboid, this light will form the derivative curve of the sample cell on the light-indicating member. Both coherent beams will therefore arrive only to the gradient curve itself, which consequently will become visible by being filled with fringes on a background without fringes. The partially light-obstructing device which gives such a result may be a diaphragm having light-absorbing and light-transmitting portions separated by at least three edges of which two together form a slit which makes an acute angle with the optical image of the light source slit, and the third coincides with said image. Such a device V is illustrated in Fig. 11, in which the edges X and Y form a slit, whereas the edge Z coincides with the optical image Q of the light source slit.

There is also another way of procuring an interferogram at the same time as a derivative curve obtained by a diagonal slit. As a partially light-obstructing device one then uses a diaphragm having at least three edges separating light-absorbing and light-transmitting portions. Such a device V is illustrated in Fig. 10 in which the edges are designated X, Y and Z. The edges X and Y form together a slit making an acute angle with the optic image Q of the light source slit, and the third edge Z is parallel to the vertical axis and cuts the said optical image. In the area outside the third edge, both coherent beams are allowed to pass. Within the corresponding area of the light-indicating member, one consequently obtains an interferogram. In the area inside the third edge, light can only pass through the diagonal slit. This light forms a gradient curve and a reference line without interference fringes on the light-indicating device.

When the mechanical derivative-recording method is being used, a simultaneous exposure of interferograms is carried out in the following way.

If the partially light-obstructing device has just one single edge between transparent and opaque portions, the image will consist of three fields, one dark, one half-illuminated and one fully illuminated, the border lines between these three fields being the two derivative contours, i. e. the gradient curve of the cell and the reference line. Interference fringes can only appear in the fully illuminated field. Whether this field is situated below the reference line or above the gradient curve depends upon the order in which transparent and opaque portions succeed each other in the partially light-obstructing device on passing downwards.

If the partially light-obstructing device has two adjacent edges between light-absorbing and -transmitting portions with the former between the edges, both beams of light will arrive at all points of the image field except the gradient curve and the reference line, which will only be half-illuminated. These two contours will consequently become visible as portions free from fringes in a background filled with fringes.

Finally, one can also obtain side by side an interferogram devoid of an inlaid derivative curve and a derivative pattern devoid of fringes with the aid of a special procedure. The partially light-obstructing device shall then have two adjacent, mutually parallel edges between light-absorbing and transmitting portions with the latter between the edges. As is well-known, such a device gives rise to a bright gradient curve and a bright reference line on a dark background, and interference fringes can only appear in areas where these overlap or coincide. If, now, the light-indicating member, e. g. a. photographic plate is allowed to be exposed during its slow movement for a little while before the partially light-obstructing device is put in place, or if the latter is removed a little while before the plate exposure under slow movement is stopped, one will of course obtain rectangular interferograms on one side of the derivative pattern, since both coherent beams are allowed to reach these portions of the plate.

I claim:

1. An apparatus for simultaneous recording of refractivity and its derivative with respective to the vertical coordinate for solutions stratified in the gravitational field, said apparatus comprising means including a diaphragm having a non-vertical light source slit for producing a beam of parallel, monochromatic light, means for splitting said light beam into two coherent beams of light, said splitting means comprising a half-transparent metal foil enclosed between and in optical contact with two congruent, plane surfaces of two optical elements of transparent and homogeneous material and with well-defined outer surfaces which are mutual mirror images with respect to the foil, a sample cell and a reference cell placed each in the path of one of the two coherent beams of light at the same distance from the beam-splitting means, means for reuniting the coherent beams of light after having passed the cells, means for projecting the reunited coherent beams together as an image of the light source slit, a partially light-obstructing device in the plane of said image comprising a diaphragm having light-absorbing and light-transmitting portions separated by at least one sharp, non-vertical edge, a light indicating member, and a lens system arranged to make said light-indicating member optically conjugate to the optical middle section of the cell at least in a vertical section through the optical system.

2. An apparatus as claimed in claim 1, in which the outer surfaces of the optical elements of the beam-splitting means have surfaces perpendicular to the direction of the beams penetrating said surfaces.

3. An apparatus as claimed in claim 1, in which the sharp edge of the partially light-obstructing device makes an angle with the optical image of the light source slit and cuts it close to one of its ends, and in which the lens system is astigmatic with vertically and horizontally oriented axes, said lens system being arranged to make the light-indicating member optically conjugate to the optical middle section of the cells in a vertical section, and to the plane of the partially light obstructing device in a horizontal section through the optical system.

4. An apparatus as claimed in claim 3, in which the diaphragm of the partially light-obstructing device has a single sharp straight edge separating light-absorbing and light-transmitting portions.

5. An apparatus as claimed in claim 3, in which the diaphragm of the partially light-obstructing device comprises a strip of light-absorbing material having two mutually parallel, straight edges.

6. An apparatus as claimed in claim 3, in which the diaphragm of the partially light-obstructing device comprises two parallel rectilinear edges forming a slit-shaped light-transmitting opening.

7. An apparatus as claimed in claim 3, in which the diaphragm of the partially light-obstructing device comprises two edges separating light-absorbing and light-transmitting portions and forming a lenticular light-transmitting area of such a form that the mid-points of all segments which the area cuts out from straight lines parallel to the light source slit image all lie on the same straight line, the lenticular area having one tip situated on the light source slit image close to one of its ends.

8. An apparatus as claimed in claim 3, in which the diaphragm of the partilaly light-obstructing device comprises two sharp, straight edges forming a wedge-shaped opening, having its tip situated on the light source slit image close to one of its ends.

9. An apparatus as claimed in claim 3, in which the diaphragm of the partially light-obstructing device, comprises three sharp edges, separating light-absorbing and light-transmitting portions, one of said edges being rectilinear and coinciding with the light source slit image which is formed by the light through the reference cell, the other two edges forming a light-transmitting area of such a form that the mid-points of all segments which the figure cuts out from straight lines parallel to the light source slit image all lie on the same straight line, said straight line making an acute angle with the light source slit image, said light-transmitting area intersecting the light source slit image close to one of its ends.

10. An apparatus as claimed in claim 3, in which the diaphragm of the partially light-obstructing device comprises three sharp edges separating light-absorbing and light-transmitting portions, one of said edges being rectilinear and vertical, intersecting the light source slit image near one of its ends, the other two edges forming a light-transmitting area which cuts said light source slit image close to said point of intersection, said area being of a form such that the mid-points of all segments which the area cuts out from straight lines parallel to the light source slit image all lie on the same straight line, said straight line making an acute angle with said light source slit image.

11. An apparatus as claimed in claim 1, in which the sharp edge of the partially light-obstructing device is parallel to the image of the light source slit, in combination with a stationary diaphragm situated closely in front of the light-indicating device and having a vertical, narrow, slit-shaped light-transmitting opening arranged to cut out a narrow strip of the superimposed cell images, and means for simultaneously moving the diaphragm of the partially light-obstructing device in a vertical direction and the light-indicating member in a horizontal direction.

12. An apparatus as claimed in claim 1, in which the sample cell and reference cell are built together into a composite cell unit.

13. An apparatus as claimed in claim 1, in which the beam-splitting means comprises two reflecting surfaces being mutual mirror images with respect to the half-transparent foil and having such an orientation relative to the direction of the light that the two coherent light beams, after reflection against said surfaces, become mutually parallel and parallel to the half-transparent foil.

14. An apparatus as claimed in claim 11, in which the diaphragm of the partially light-obstructing device has a single sharp edge separating light-absorbing and light-transmitting portions.

15. An apparatus as claimed in claim 11, in which the diaphragm of the partially light-obstructing device comprises a strip of light-absorbing material having two parallel straight edges.

16. An apparatus as claimed in claim 11, in which the diaphragm of the partially light-obstructing device comprises two parallel rectilinear edges forming a slit-shaped, light-transmitting area, said diaphragm being mounted in a shaft.

17. An apparatus as claimed in claim 1, comprising plane mirrors behind the cells, perpendicular against the radiation, the beam-splitting means and the beam-reuniting means being identical.

18. An apparatus as defined in claim 17 in which the back walls of the cells serve as plane mirrors.

References Cited in the file of this patent

UNITED STATES PATENTS

| | | |
|---|---|---|
| 1,565,533 | Twyman et al. | Dec. 15, 1925 |
| 1,709,809 | Rashevsky | Apr. 16, 1929 |
| 2,256,804 | Hurley | Sept. 23, 1941 |
| 2,583,596 | Root | Jan. 29, 1952 |
| 2,745,310 | Horn | Jan. 29, 1952 |

FOREIGN PATENTS

| | | |
|---|---|---|
| 595,211 | Germany | Apr. 12, 1934 |
| 130,687 | Sweden | Jan. 30, 1951 |